United States Patent
Hartman

[15] 3,682,552
[45] Aug. 8, 1972

[54] RANGE FINDER TO CONTINUOUSLY DETERMINE RANGE UTILIZING A RETICULE HAVING INDICIA

[72] Inventor: Robert B. Hartman, Bridgeport, Conn.

[73] Assignee: Remington Arms Company, Inc., Bridgeport, Conn.

[22] Filed: March 12, 1968

[21] Appl. No.: 712,430

[52] U.S. Cl. .......................................... 356/3, 33/51
[51] Int. Cl. .............................................. G01c 3/04
[58] Field of Search ............ 356/1, 4, 8, 3; 33/63, 51, 33/66

[56] References Cited

UNITED STATES PATENTS

| | | | |
|---|---|---|---|
| 1,708,389 | 4/1929 | Karnes | 33/51 |
| 1,627,097 | 5/1927 | Kauch | 33/66 |
| 2,379,496 | 7/1945 | Saunier | 356/1 |
| 2,397,160 | 3/1946 | Schwartz | 356/1 |
| 2,403,308 | 7/1946 | Schwartz | 356/1 |
| 2,472,809 | 6/1949 | Decker | 33/51 |
| 2,547,232 | 4/1951 | Schwartz | 356/1 |
| 3,435,744 | 4/1969 | Stimson | 356/1 |

*Primary Examiner*—Rodney D. Bennett, Jr.
*Assistant Examiner*—J. M. Potenza
*Attorney*—D. Verner Smythe

[57] ABSTRACT

The device and method relates to a range finder which can be used in conjunction with guns, cameras and similar articles, the device employing a source of radiant energy to produce a spot on the target, the spot being discernible on a reticule, the line of sight and the beam of radiant energy being related to that the apparent position of the spot on the reticule can be used to indicate the range.

4 Claims, 4 Drawing Figures

INVENTOR
ROBERT B. HARTMAN
BY
D. Verner Smythe
ATTORNEY

RANGE FINDER TO CONTINUOUSLY DETERMINE RANGE UTILIZING A RETICULE HAVING INDICIA

This invention relates to a range finder which can be used in conjunction with guns, cameras and similar devices.

The prior art has used various types of range finders, most of which use a base line and a movable component which requires a relatively cumbersome and complicated structure. One of the difficulties in prior devices has been that the various moving parts are costly to produce and to assemble and to maintain in adjustment.

In one aspect of the invention, a radiant source of energy is mounted in spaced relation to a reticule so that the line of sight through the reticule is in the same plane as the beam of radiant energy. The reticule has distance indicating means or indicia thereon so that the position of the spot in the target plane as it appears on the reticule will provide an indication of the range. In a further aspect, use in conjunction with firearms, the reticule can have additional indicia placed thereon so that the device range finder can be used as a gun sight, the projectile trajectory being taken into account when sighting the gun.

These and other objects, advantages end features of the invention will become apparent from the following description and drawings.

IN THE DRAWINGS

Figure 1:
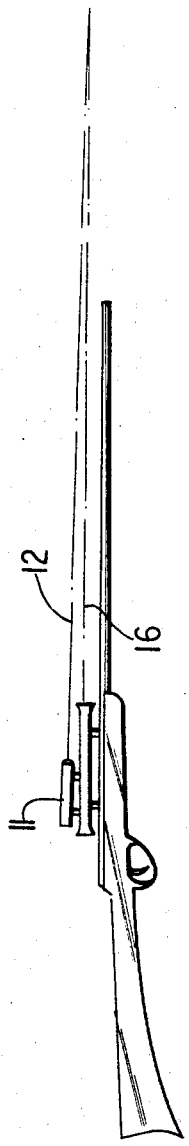
FIG. 1 is a side view of a rifle having a range finder of the present invention thereon.
Figure 2:
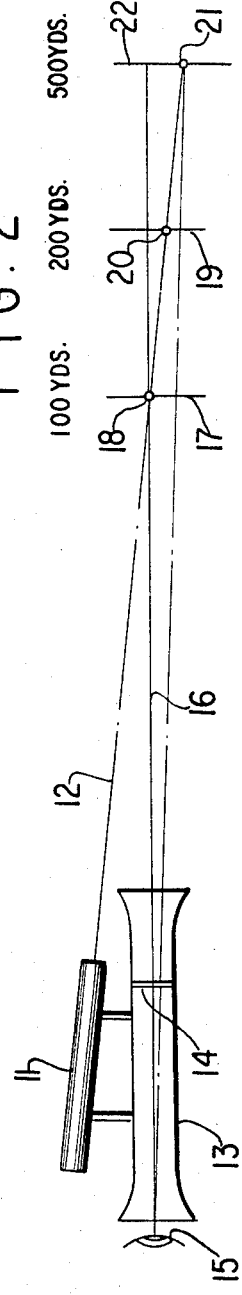
FIG. 2 is a schematic view showing the principles of the invention.
Figure 3:
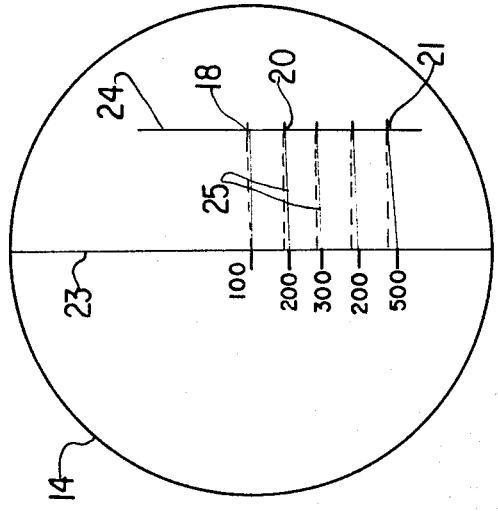
FIG. 3 is an enlarged view of a reticule employing the invention.

Referring to FIG. 2, the invention is described where it is used in conjunction with a range finder for a rifle or gun. A source of energy 11, which may produce a visible light, laser beam or any other suitable type of radiant energy beam 12, is mounted on a sight directing device, such as a telescope 13 with a reticule 14 which is spaced from the eye 15. Thus, the reticule is spatially located relative to the eye and also relative to the source of radiant energy 11. The reticule may comprise a system of visible lines providing a scale or indicia display as is known in the art. By way of example, the line of sight 16 in the embodiment shown in FIG. 2 at 100 yards will be intercepted at the target plane 17 at point 18 which is the intersection of the radiant energy beam 12 and the line of sight 16. In this instance, the image of point 18 will appear on the reticule or will be discernible thereon in relation to the indicia on the reticule to indicate 100 yards as shown in FIG. 3. If the target plane 19 is, for example at 200 yards, then the intersection of the new sight line of sight and energy source beam will be at point 20 which in this form is displaced visibly downwardly from previous point 18. If the target is located at a more distant point, such as 500 yards, then the spot will appear at point 21 on target plane 22, which is apparently still further displaced downwardly on the reticule so as to indicate 500 yards.

Use of the device as a gun sight will now be described, reference being made to FIG. 3 which depicts the reticule 14 of FIG. 2. When used as a gun sight, it is desirable not to have the spot on the vertical cross-hair 23 since then there would be a tendency to place the illuminated spot on the target. Thus, a displaced target scale 24 is located on a separate parallel scale line and the reticule has calibrated lines 25 leading from vertical cross-hair 24 to cross-hair 23 to compensate for the trajectory of a projectile for the gun concerned. In use, the energy spot in the target plane appears on cross-hair 24, FIG. 3. This spot is initially placed on the target to establish range. The shooter then traverses the target along the appropriate calibrated line 25 to vertical cross-hair 23. When aimed at this intersection, the rifle is properly aimed at the target to compensate for the trajectory. It should be noted that different calibrated reticules may be used for different ammunition.

Figure 4:
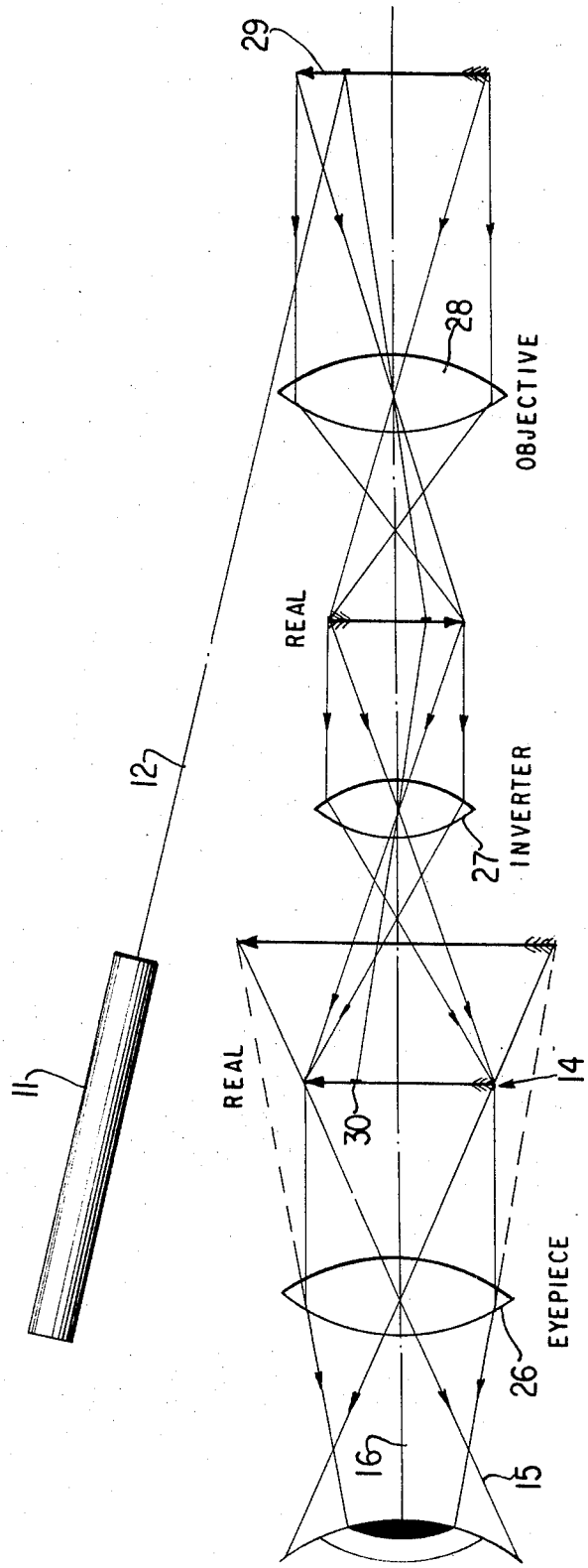
FIG. 4 is a schematic view showing an optical system that can be used.

As schematically shown in FIG. 4 a telescope arrangement can be employed wherein there is an eye piece 26, an inverting lens 27 and an objective lens 28. The eye is depicted at 15 and the line of sight is at 16 corresponding to FIG. 2. The radiant energy source is at 11 and its beam at 12. The reticule 14 is similar to that previously described. The object spot on target plane 29 appears at 30 on the reticule.

It should be apparent that variations may be made in the construction and arrangement of parts without departing from the spirit of the invention except as set forth in the appended claims.

What is claimed is:

1. In a range finder for determining the range to a target by the eye, the combination including a single reticule having indicia, a radiant energy spot producing source for providing a spot of energy on the target, means supporting said reticule and said energy source in fixed spatial relationship and in angular relation to each other, means for positioning the eye relative to said reticule and said energy source, a line from the eye of the user to the projected spot of energy on the target and the axis of the beam of the energy source being in the same plane, so that different ranges can be continuously determined by the eye directly from the apparent position of said spot relative to indicia on said reticule, said spot being actually superimposed on the target.

2. A device according to claim 1 wherein the reticule has calibrated indicia between indicia indicating the range and vertical sighting indicia means so as to provide compensation for trajectory of a projectile.

3. A device according to claim 3 wherein there is an objective lens, an inverting lens, an eye piece, and a reticule, the reticule being between the eyepiece and inverter lens.

4. A device according to claim 1 wherein the radiant energy source is a laser.

* * * * *

UNITED STATES PATENT OFFICE
CERTIFICATE OF CORRECTION

Patent No. 3,682,552                    Dated August 8, 1972

Inventor(s) Robert B. Hartman

It is certified that error appears in the above-identified patent and that said Letters Patent are hereby corrected as shown below:

Patent Front Page, [57] line 6, "to" should be --so--. Column 1, line 26, "end" should be --and--. Column 2, line 55, "claim 3" should be --claim 2--.

Signed and sealed this 23rd day of January 1973.

(SEAL)
Attest:

EDWARD M. FLETCHER, JR.                ROBERT GOTTSCHALK
Attesting Officer                      Commissioner of Patents